United States Patent [19]
Jackson et al.

[11] Patent Number: 5,234,295
[45] Date of Patent: Aug. 10, 1993

[54] ADJUSTABLE SUPPORT FIXTURE

[75] Inventors: Richard S. Jackson; Douglas A. Richard, both of St. Louis, Mo.

[73] Assignee: Sunnen Products Company, St. Louis, Mo.

[21] Appl. No.: 898,076

[22] Filed: Jun. 12, 1992

[51] Int. Cl.$^5$ .................... B23C 9/00; G01B 5/02
[52] U.S. Cl. .................... 409/227; 33/533; 33/567; 33/642; 51/165 R; 409/241
[58] Field of Search ............ 29/57, 888.061, 888.011; 409/227, 241, 221, 220, 219; 51/165 R, 165.74; 269/277; 33/630, 626, 628, 629, 642, 643, 631-635, 645, 533, 568, 567, 567.1

[56] References Cited

U.S. PATENT DOCUMENTS

| | | | |
|---|---|---|---|
| 1,273,365 | 7/1918 | Hazelton et al. | 409/227 |
| 3,552,027 | 1/1971 | Jacobsen | 33/642 |
| 3,572,680 | 3/1971 | Neff | 269/8 |
| 3,807,034 | 4/1974 | Pevzner et al. | 29/559 |
| 3,895,446 | 7/1975 | Orlov et al. | 33/533 X |
| 4,375,129 | 3/1983 | Dunk | 33/642 |
| 4,406,069 | 9/1983 | Clement | 33/642 |
| 4,561,815 | 12/1985 | Trevarrow | 409/227 |
| 4,789,279 | 12/1988 | Rottler et al. | 409/227 |
| 4,792,265 | 12/1988 | Rottler et al. | 409/241 X |
| 4,845,899 | 7/1989 | Dashevsky | 269/277 X |
| 4,882,849 | 11/1989 | Amir | 33/567 |
| 4,890,421 | 1/1990 | Moore, Jr. | 51/165 R |

FOREIGN PATENT DOCUMENTS

| | | | |
|---|---|---|---|
| 684282 | 9/1979 | U.S.S.R. | 33/567 |
| 2124386 | 2/1984 | United Kingdom | 33/626 |

Primary Examiner—William Briggs
Attorney, Agent, or Firm—Haverstock, Garrett and Roberts

[57] ABSTRACT

An adjustable support fixture and method for using same with a cutting assembly for milling or grinding a flat surface on a workpiece, the fixture including a suspended platen on which the workpiece is mounted, removable apparatus for establishing the cutting plane, devices for positioning the flat surface of the workpiece against the plane-establishing apparatus, and a mechanism for retaining the workpiece in this position as the plane-establishing apparatus is removed and the cutting operation is performed.

28 Claims, 6 Drawing Sheets

ADJUSTABLE SUPPORT FIXTURE

BACKGROUND OF THE INVENTION

1. Technical Field

This relates to support fixtures for restraining a workpiece during a machining operation, and, more particulary, to adjustable support fixtures for precisely and accurately bringing the workpiece, and particularly a flat surface thereon, into a predetermined oriention relative to the machining device.

2. Background Art

Due to the expense associated with purchasing new engine heads and blocks, and in the interest of recycling the plentiful quantities of salvageable heads and blocks available, industries across the United States produce thousands of rebuilt engines daily using refurbished heads and blocks. A key process that frequently must be performed when reconditioning a workpiece such as an engine head or block is the precise remilling or regrinding of the face, i.e., the gasket surface of the head or the deck surface of the block. Cutting precision on the order of thousandths of an inch is necessary to reestablish the tight seal required when the workpiece is reattached to the engine along this facial surface. Furthermore, it is desirable to remove only the minimum amount of material necessary to produce a planar face when performing the cutting process so as to alter the compression ratio of the engine as little as possible.

The equipment necessary to perform the cutting process includes a grinding or milling machine used in conjunction with support means to which the workpiece is mounted during the grinding or milling operation, the support means having adjustable means for moving the face into contact with the cutting portion of the grinding or milling machine. The Neff U.S. Pat. No. 3,572,680 discloses support means including a table 14 having means for adjusting the table 14, but only in the horizontal plane. Such a limitation of the adjusting means makes the device of the Neff patent unsuitable for the present machining needs.

Another prior art device of interest is in Hazelton and Einstein U.S. Pat. No. 1,273,365 which discloses support means including a table G, the support means having adjusting means including struts 14 on which the table G is mounted. The adjusting means serve to vertically dispose the table G between two preset positions. However, incremental vertical ajustment of the table G is not possible, making it impossible to perform the cutting process with the precision necessary to effectively recondition engine heads or blocks.

In Trevarrow U.S. Pat. No. 4,561,815 and Rottler et al. U.S. Pat. No. 4,789,279 wedge means are disclosed to impart vertical movement to a workpiece to align the workpiece with machining means. However, neither patent discloses means for tilting the workpiece about both of its horizontal axes. Furthermore, both the Trevarrow and Rottler devices require a skilled operator to carefully align the workpiece with the corresponding machining tool.

Another prior art device of interest is in Pevner et al. U.S. Pat. No. 3,807,034 which discloses means for imparting vertical movement to a table A by manually adjusting the table A about its horizontal axes. No means for automatically aligning the table are disclosed, thereby requiring a skilled operator to properly align the Pevner device each time a workpiece is mounted thereon.

It is therefore clear that prior art adjustable support devices fail to provide adjusting means that can assure that the amount of material removed during each cutting operation will be only the minimum amount necessary to yield a planar face. Furthermore, prior art adjustable support means are difficult and time consuming to set up, difficult and time consuming to adjust, and difficult and time consuming to operate, frequently requiring repeated adjusting and machining of a single workpiece surface. Consequently, prior art adjustable support means are labor intensive, require substantial operator expertise, are expensive to operate, and often produce an inferior product.

SUMMARY OF THE INVENTION

The above and other problems of prior art adjustable support fixtures are overcome by the present invention of an adjustable support fixture capable of bringing a surface of a workpiece mounted thereon into self-generated precise planar alignment with the cutting path of motion of a machining assembly such as a milling or grinding machine. The adjustable support fixture includes a workpiece-supporting platen having means to locate and support the workpiece so that the surface to be machined faces upwardly away from the platen.

The fixture also includes means to precisely and accurately align the surface to be machined in the planar cutting path of movement of the machining or cutting head of the machining assembly, including a carriage movable between a position spaced from the platen and a position aligned with and extending above the platen. The carriage has at least two members located thereon having means to adjust the positions thereof on the carriage to establish a plane in the cutting plane of the cutting head.

Furthermore, the fixture includes means for supporting the platen and for imparting vertical movement to the platen, the means including a plurality of vertically adjustable lifting devices at spaced locations below the platen that are simultaneously actuatable to apply a vertical drive force to the platen and the workpiece located thereon. Additionally, the fixture includes platen-supporting means that are actuatable to hold the platen in a fixed position independently of the lifting devices.

Finally, the fixture includes track means including means on the carriage engageable therewith for movably supporting the carriage for movement therealong between a position aligned with the platen and a position spaced therefrom.

It is therefore a principal object of the present invention to teach the construction and operation of a device for extremely accurately locating a flat surface such as on an engine head or block in the plane of a tool such as a milling or grinding tool.

Another object is to facilitate the reconditioning of engine heads, blocks and other devices having flat surfaces to be milled.

Another object is to make it possible to precisely position a flat surface three dimensionally.

Another object is to improve the quality and accuracy of flat surfaces on engine parts so as to improve the operating efficiency of the engines on which they are used.

Another object is to make it possible to remove the minimum amount of material from the engine head or block surface necessary to establish the required seal when the head or block is attached to the engine along the surface.

Another object is to make it unnecessary to adjust the fixture each time workpieces of similar dimensions are mounted on the fixture.

Another object is to make it possible to mount workpieces of varying dimensions on the same fixture.

Another object is to provide an adjustable fixture that operates with improved quickness and efficiency.

Another object is to provide an adjustable fixture that is relatively less labor intensive than known devices used for the same or similar purposes to adjust and to operate.

Another object is provide an adjustable fixture which less-skilled operators can accurately adjust and operate.

Another object is to provide a greater yield of acceptable finished product.

These and other objects and advantages of the present invention will become more apparent upon a perusal of the following specification taken in conjunction with the accompanying drawings wherein similar characters of reference refer to similar structures in each of the separate views.

BRIEF DESCRIPTION OF THE DRAWINGS

In the drawings that illustrate preferred embodiments of the invention.

BEST MODE FOR CARRYING OUT THE INVENTION

Figure 1:
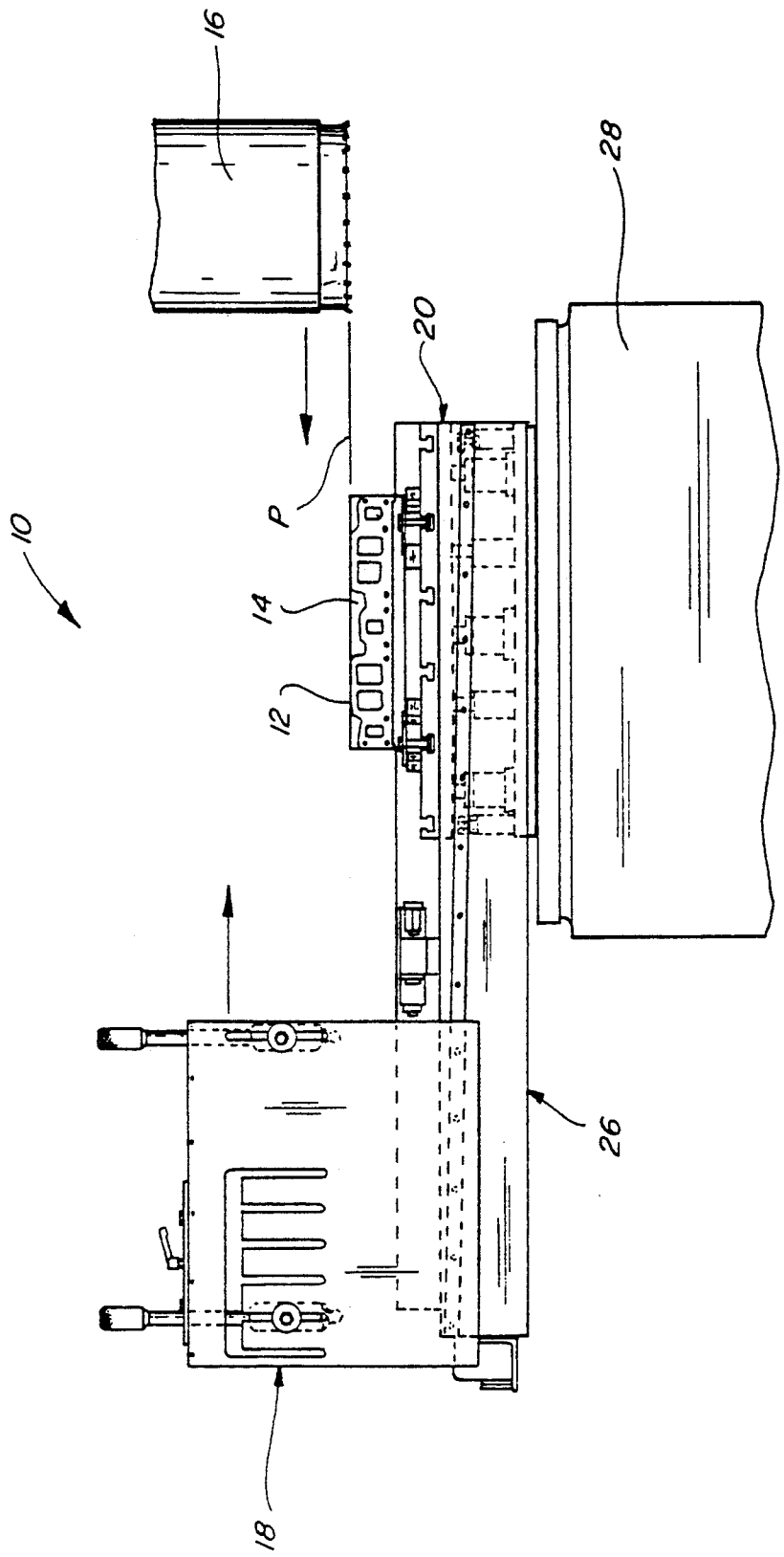
FIG. 1 is a partial front elevational view of the entire machining assembly showing the adjustable support fixture having a workpiece mounted thereon in relation to the support base and the cutting head.

The idea of the present invention is to provide means 10 for accurately positioning the flat face 12 of a device 14 such as an engine head or block in the plane P of the path of movement of a cutting head 16 of a horizontally movable cutting device such as a milling or grinding machine so that when the cutting head 16 moves across the surface 12 it will take off a very small but precise amount of the head surface 12, leaving the surface 12 flat, smooth and accurate. This is a service that is needed by engine reconditioners and others. Being able to repeatedly and accurately locate a head surface 12 relative to the cutting head 16 is at the heart of the present invention.

To accomplish this, the means 10 include means 18 to establish the cutting plane P of movement of a machine assembly, means 20 to support and hold the workpiece 14, driving means 22 to move the face 12 of the supported head or block 14 against the plane-establishing means 18, and self-locking means 24 to hold the head support means 20 in that position, whereupon, when the means 18 that established the plane P are moved out of the way of the cutting head 16, the cutting operation can be performed.

In the following description the head supporting means 20 will be described first, followed by a description of the plane-establishing means 18 including the adjustable structure thereon that establishes the plane P for the head or block surface 12 to be cut, and finally track means 26 enabling the plane establishing means 18 to be moved to communicate with or not to communicate with the workpiece support means 20.

FIG. 1 shows the cutting head 16 and the positioning means or fixture 10. The fixture 10 is shown affixed to, and supported by, a base 28, and includes the plane-establishing means in the form of a carriage assembly 18, the workpiece support means in the form of a floating or adjustable platen assembly 20, and the track means 26 connecting the carriage assembly 18 to the platen assembly 20. The carriage assembly 18 is shown positioned away from the platen assembly 20, and the workpiece 14 is shown mounted on the platen assembly 20 after being positioned so that its top surface 12 is coplanar, or substantially coplanar, with the cutting plane P of the cutting head 12.

Figure 2:
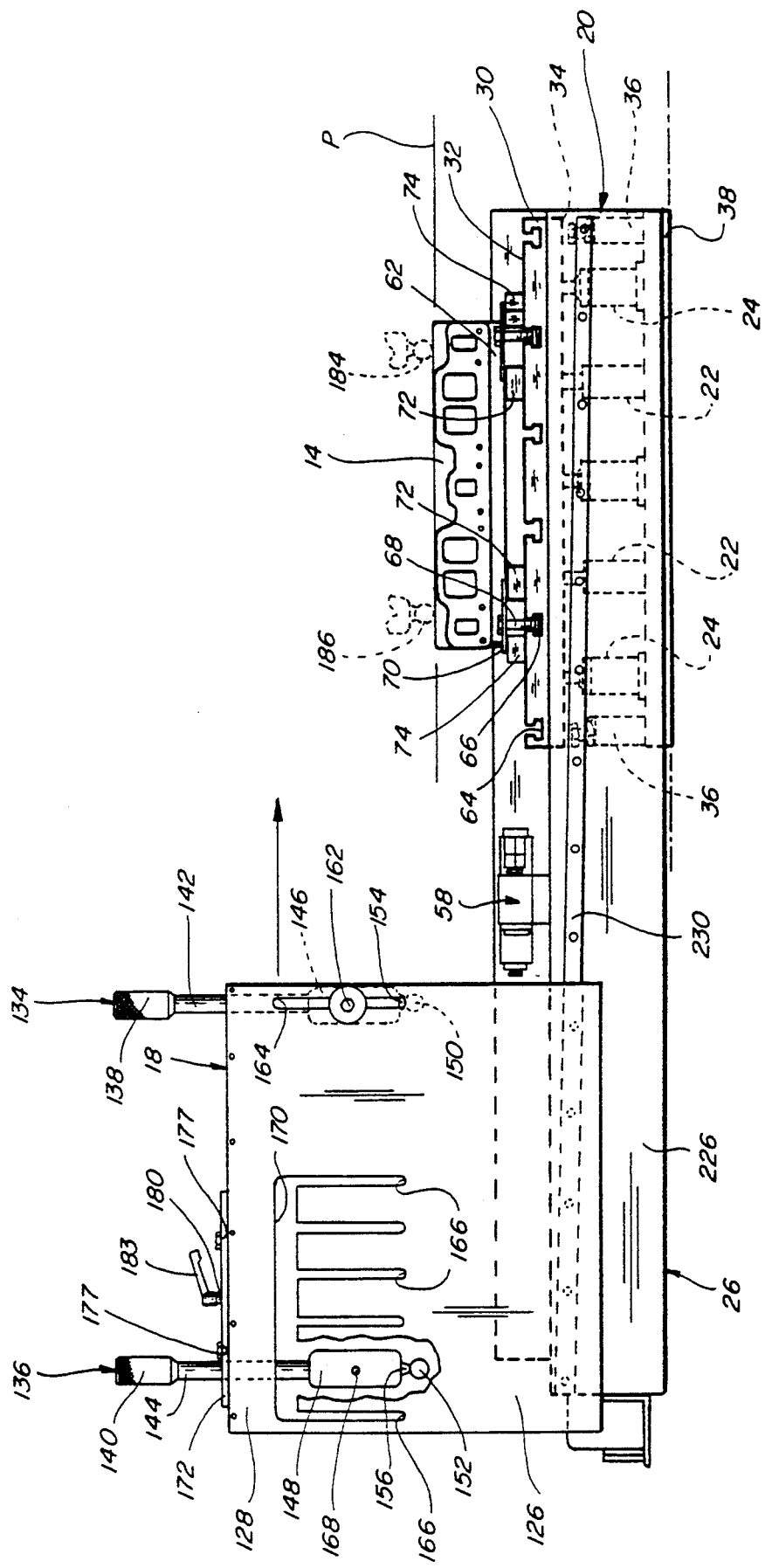
FIG. 2 is a detail front elevational view of the adjustable support fixture having a workpiece mounted thereon and the carriage assembly spaced from the platen assembly, part of the fixture being shown in dotted outline.
Figure 3:
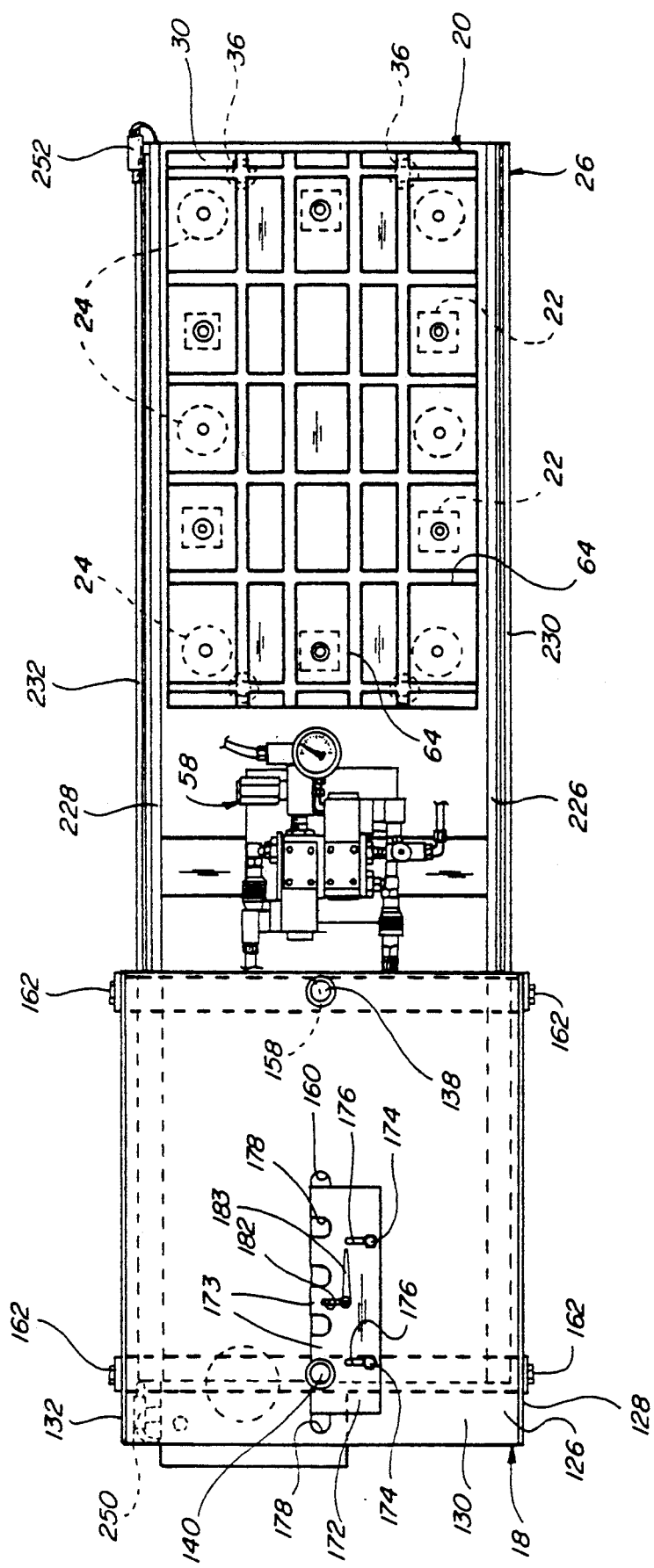
FIG. 3 is a top plan view of the support fixture without a workpiece mounted thereto, the carriage assembly being spaced from the platen.

The fixture 10 can be seen in greater detail in FIG. 2. The platen assembly 20 includes a rectangular platen 30 having an upper surface 32 and a lower surface 34. Depending on the stage of operation, the platen 30 is supported from beneath by the driving means in the form of an array of drive cylinder assemblies 22 (six in the preferred embodiment), the self-locking means in the form of an array of self-locking cylinder assemblies 24 (six in the preferred embodiment), or by four stationary posts 36 having upper surfaces coplanar with each other shown located adjacent respective corners of the platen 30, the posts 36 being adjusted to maintain the upper surface 32 of the platen 30 in a plane parallel to the cutting plane P of the cutting head 16. FIG. 3 most clearly illustrates the spacial arrangement of the assemblies or support means 22, 24 and 36. The cylinder assemblies 22 and 24 and posts 36 are mounted on a stationary platform 38 attached to the base 28 by bolts 39 (shown in FIG. 6).

Figure 4:
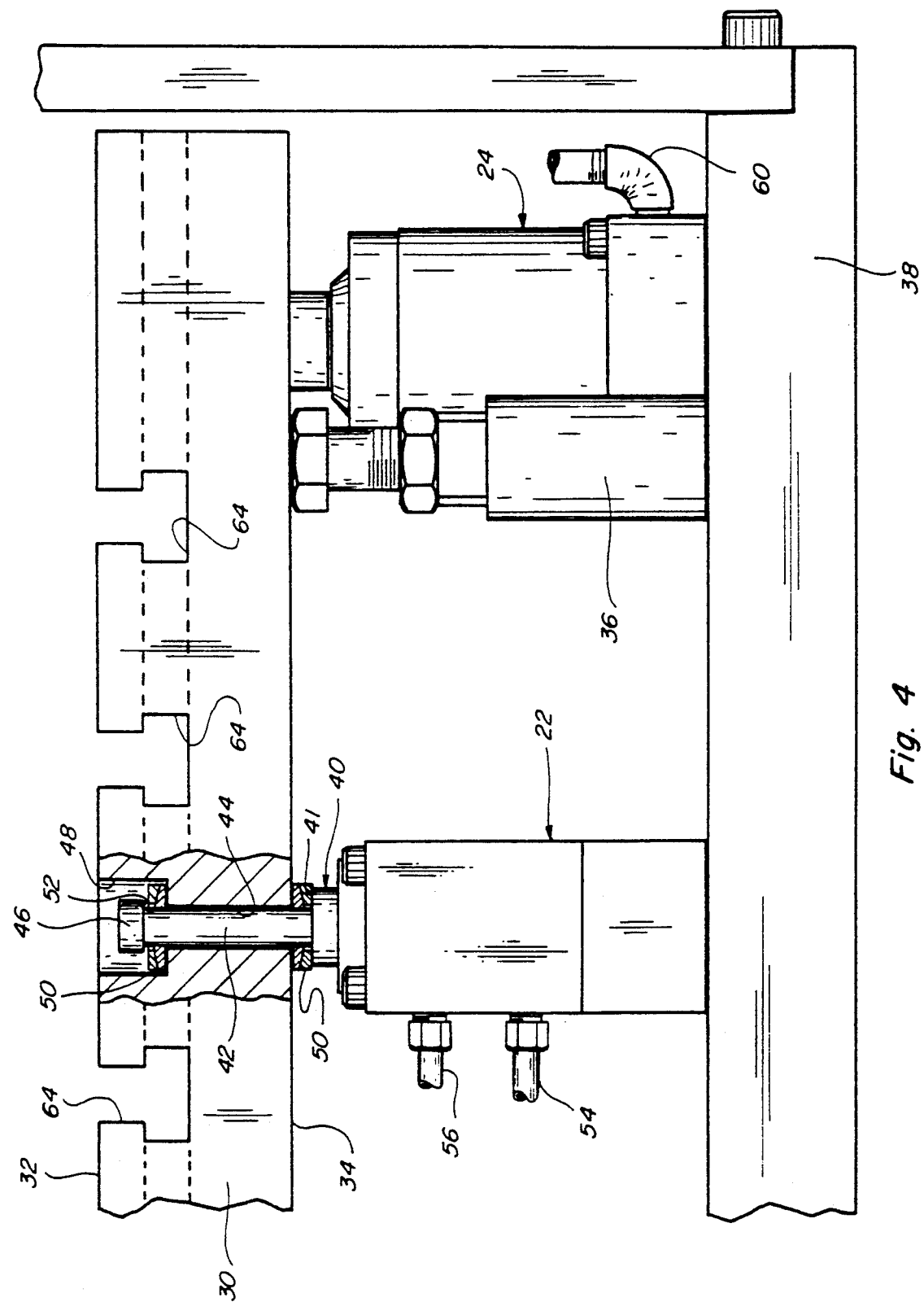
FIG. 4 is an enlarged fragmentary end view partly in section, showing the details of the platen support means.
Figure 5:
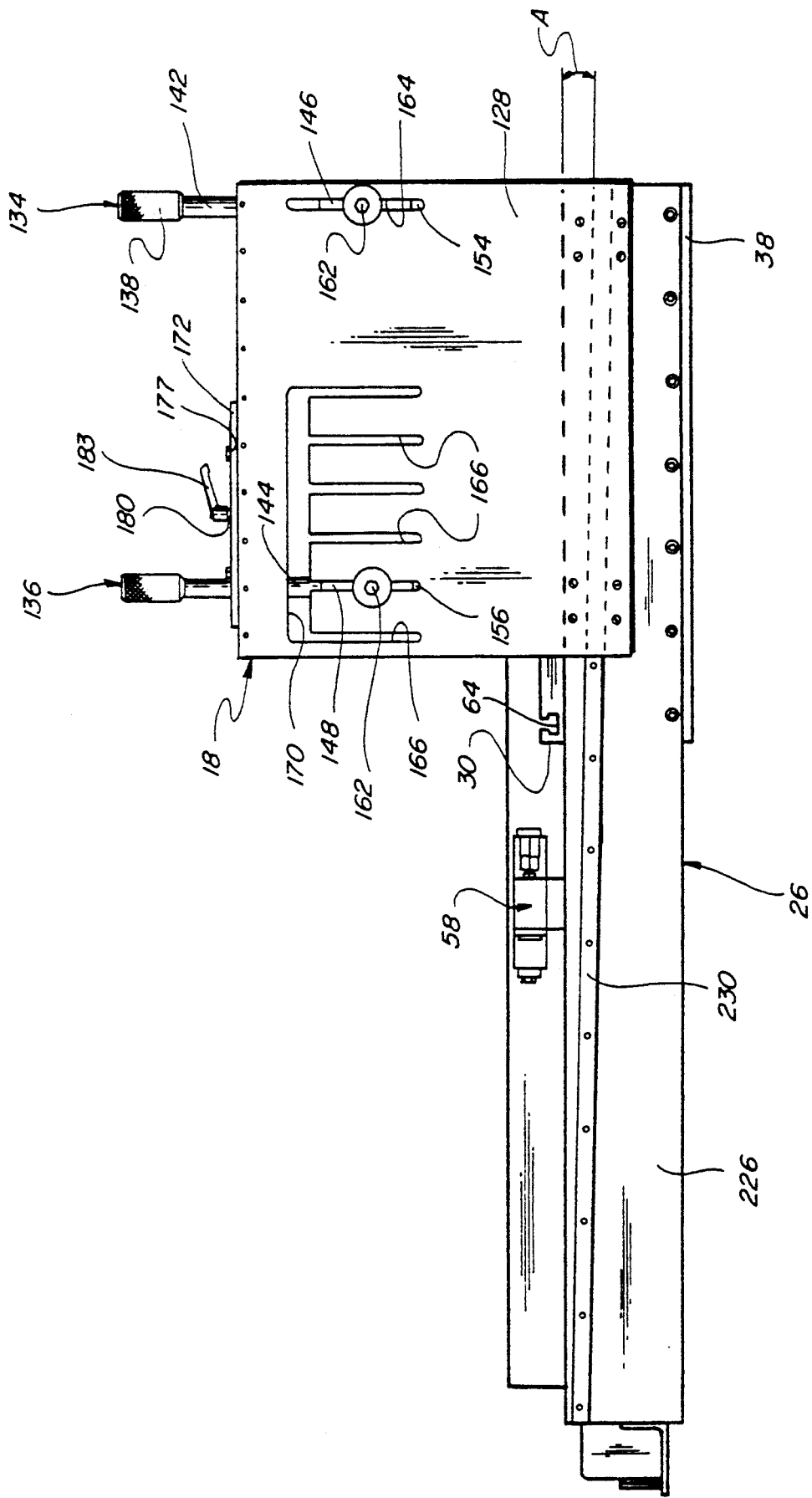
FIG. 5 is a front elevational view of the support fixture with the carriage assembly aligned with the platen.

FIG. 4 shows a shaft member 40 extending from the upper end of each of the drive cylinder assemblies 22 and having a reduced diameter portion along a segment 42 of its length, forming a shoulder 41 at one end thereof. Each drive cylinder assembly 22 is affixed to the platen 30 by means of its reduced diameter shaft segment 42 extending through a corresponding oversized vertical passage 44 in the platen 30. An enlargement 46 is formed at the upper end of each reduced diameter shaft segment 42 and resides in a corresponding cylindrical counterbore 48 extending downwardly from the upper surface 32, each of the counterbores 48 being coaxial with the respective passage 44. Two two-piece spherical washers 50 are mounted on each reduced diameter shaft segment 42, one washer 50 being located between the enlargement 46 and the bottom surface of the cylindrical counterbore 48, and the other spherical washer 50 being located between the lower surface 34 and the shoulder 41 of the shaft member 40. The two-piece spherical washers 50 include a pair of annular members having flat non-opposing surfaces and mating opposing surfaces that form adjustably engageable spherical surface portions. In this way the annular members of each spherical washer 50 can shift in relation to each other along their opposing surfaces while keeping their flat non-opposing surfaces flush against flat surfaces that are periodically located adjacent the spherical washers 50. The reduced diameter segment 42 is of a length that will cause a small gap 52 to exist between the enlargement 46 and the shoulder 41, the exact gap 52 location varying according to the operation being performed. In this way, a given pair of spherical washers 50 is never simultaneously constrained between the enlargement 46 and the shoulder 41, the opposing sides of the annular members of each washer 50 thereby remaining free to shift in relation to each other so as to allow the platen 30 to tilt slightly about its horizontal axes.

In the preferred embodiment, the drive cylinder assemblies 22 are two-way hydraulic cylinder assemblies in communication with first and second hydraulic lines 54 and 56 connected to hydraulic activation means 58. Fluid is delivered through the second hydraulic line 56 throughout all phases of operation, imparting a force within the drive cylinder assemblies 22 that, if unopposed, causes each drive cylinder assembly 22 to retract its shaft 40, causing the corresponding enlargement 46 to be driven downwardly against its adjacent spherical washer 50 which, in turn, is pressed against the bottom surface of the counterbore 48, thereby imparting a vertical lowering or pulling force to the platen 30. Conversely, when fluid is delivered through the first hydraulic line 54, the force of retraction is overcome by an opposite force causing each drive cylinder assembly 22 to extend its shaft 40 and drive the corresponding shoulder 41 upwardly against the adjacent spherical washer 50 which, in turn, is pressed against the lower surface 34 of the platen 30, thereby imparting a vertical lifting or pushing force to the platen 30.

Also in the preferred embodiment, the self-locking cylinder assemblies 24 are one-way hydraulically locking cylinder assemblies in communication with a third hydraulic line 60 also connected to the hydraulic activating means 58, the upper end of each self-locking cylinder assembly 24 being held in contact with the lower surface 34 of the platen 30 through all phases of operation due to a mechanical spring (not shown) located internally of each hydraulic self-locking cylinder assembly 24. When fluid is delivered through the third hydraulic line 60 a collet (not shown) internal to each self-locking cylinder assembly 24 is clamped tightly around an internal cylinder (not shown) coaxial with the respective self-locking cylinder assembly 24, arresting vertical movement of the hydraulically self-locking cylinder assembly 24, and thereby preventing the platen 30 from moving downwardly. The self-locking assemblies 24 are actuated while the drive cylinder assemblies 22 are in their raised or upwardly extended positions and before the pressure is applied via the second hydraulic line 56 to retract the shaft 40.

As shown in FIG. 2, a cradle 62 having a workpiece 14 mounted therein is centered on the upper surface 32 of the floating platen 30. The platen 30 contains a grid of open-ended inverted T-shaped channels 64 extending downwardly from its upper surface 32. Nuts 66 of dimensions impeding their rotation when inserted into the widest portion of the channels 64, are inserted therein. The nuts 66 threadedly receive platen bolts 68 which extend upwardly through the channels 64 and operate to anchor the cradle 62. A mounting plate 70 for each nut 66 and bolt 68 has an aperture therethrough (not shown) of a diameter slightly larger than the diameter of the stem of workpiece mounting bolts 68. Each of the mounting plates 70 is positioned with its aperture aligned coaxially over the corresponding nut 66, one end of the plate 70 resting on a respective cradle clamp member 72. A support block 74 is placed under the opposing end of each mounting plate 70. Upon tightening the workpiece mounting bolts 68, the cradle 62 is rigidly mounted on the upper surface 32 of the platen 30 with the surface 12 to be milled or ground facing upwardly.

The carriage assembly 18, as shown in FIGS. 1, 2, 3, 5 and 6, comprises a U-shaped hood 126 having a vertical front wall 128, a top or overhead wall 130 and a vertical back wall 132, the vertical front wall 128 having its top edge affixed to the front edge of the overhead wall 130, and the vertical back wall 132 having its top edge affixed to the back edge of the overhead wall 130. A right or forward handle assembly 134 and a left or rearward handle assembly 136 include corresponding right and left handle portions 138 and 140 affixed to the upper end of right and left vertical rods 142 and 144, respectively. Right and left transversely extending beams 146 and 148 are affixed adjacent to the lower ends of the corresponding right and left vertical rods 142 and 144. Right and left transversely extending bars 150 and 152 are aligned with, and spaced below, the right and left transversely extending beams 146 and 148, respectively, by right and left tranversely extending spacers 154 and 156, respectively, (see FIG. 6). These are shown mounted in the hood 126 such that the right vertical rod 142 extends through an aperture 158 located in the right portion of the overhead wall 130, and the left vertical rod 144 extends through a longitudinal slot 160, (FIG. 3), located in the left portion of the top wall 130.

One of four bolt and washer assemblies 162 extends transversely through a vertical slot 164 located in the right portion of the front wall 128 of the hood 126, and is engageably received within an aperture (not shown) located in one end of the right transversely extending beam 146. Another of the bolt and washer assemblies 162 extends transversely through a predetermined one of six vertical slots 166 located in the rearward portion of the front wall 128, and is engageably received within an aperture 168 located in one end of the left transversely extending beam 148. For reasons explained further herein, a horizontal slot 170 intersects the top end of each of the rearward vertical apertures 166, thereby providing communication between the six rearward slots 166.

The arrangement of the right or forward vertical slot 164, the six lefthand or rearward vertical slots 166, and the horizontal slot 170 in the front vertical wall 128 is mirrored in an arrangement of slots (not shown) in the back vertical wall 132 of the hood 126. The two remaining bolt and washer assemblies 162 extend transversely through respective right and left vertical slots of the back wall 132 so as to be engageably received within apertures (not shown) located in the respective opposing ends of the transversely extending beams 146 and 148. It can be appreciated that the opposing pair of forward vertical apertures 164 function in conjunction with their respective bolt and washer assemblies 162 to provide means for vertically adjusting and locking the forward handle assembly 134 at a desired vertical position along the forward slots 164.

As shown in FIG. 3, a rectangular plate 172 having teeth 173 (five in the preferred embodiment) formed along one longitudinal side is maintained in sliding engagement with the top surface of the rearward portion of the overhead wall 130 of the hood 126 by way of two guide posts 174 extending through respective parallel transversely extending apertures 176 located in the plate 172, each post 174 being affixed at one end to the top surface of the overhead wall 130. An annular flange 177, (see FIGS. 2 and 5), is formed in the opposing end of either post 174, each flange 177 being adjacent the top surface of the plate 172, and having a diameter greater than the width of the respective transverse slot 176. It is apparent that the plate 172 is therefore restricted from vertical and longitudinal movement, while being slidable transversely (as indicated by the arrows) for a distance equivalent to the length of the transverse apertures 176. The width of the plate 172, in conjunction with the length of the tranverse slots 176 and the location of the posts 174, is such that when the plate 172 is transversely slid to its position closest to the front vertical wall 128, the longitudinal slot 160 is completely unobstructed by the plate 172, yet when the plate 172 is transversely moved to its position closest to the vertical back wall 132, the teeth 173 of the plate 172 overlap or substantially overlap the longitudinal slot 160, yielding irregularly shaped apertures 178 between adjacent teeth 173 and beyond either end tooth 173, each aperture 178 having a minimum diameter slightly greater than the diameter of the rearward vertical rod 144, thereby permitting the left vertical rod 144 to extend through the longitudinal slot 160 at locations between adjacent teeth 173 and beyond either end tooth 173.

A locking post 180, (shown in FIGS. 2, 5 and 6), affixed at one end to the top surface of the overhead wall 130 extends upwardly through a third transversely extending aperture 182 in the plate 172, the third transversely extending aperture 182 being parallel to, and at least as long as, either transverse aperture 176. A quick-release locking nut or lever 183 is attached to the upper end of the locking post 180. Depending on which direction the lever 183 is turned, transverse movement of the plate 172 will be permitted or prevented.

Looking at FIG. 2 in conjunction with FIG. 3, it is apparent that when the bolt and washer assemblies 162 at either end of the rearward or left handle assembly 136 are loosened, the left handle assembly 136 can be vertically removed from its position in one respective pair of opposing rearward vertical slots 166 and moved into opposing horizontal slots 170 in preparation to reposition it into another pair of opposing vertical slots 166, the walls of the irregular aperture 178 through which the left vertical rod 144 extends serving to guide the left handle assembly 136 as it is raised so as to prevent the opposing ends of the left transversely extending beam 148 from becoming jammed between the front vertical wall 128 and the back vertical wall 132 of the hood 126. Furthermore, it is apparent that when the quick-release lever 183 of the post 180 is turned so as to unlock the plate 172, and the plate 172 is slid transversely away from the longitudinal aperture 160 until the longitudinal slot 160 is completely unobstructed by the teeth 173, the rearward vertical rod 144 can be moved along the longitudinal slot 160 while the affiliated transverse bolt and washer assemblies 162 follow longitudinally along their respective horizontal slots 170. Once these bolt and washer assemblies 162 are aligned above a desired pair of opposing rearward vertical apertures 166, the plate 172 is then transversely repositioned to where its teeth 173 substantially overlap the longitudinal aperture 160 so that the rearward vertical rod 144 is within the irregular aperture 178 corresponding to the chosen pair of opposing vertical slots 166, whereupon the quick-release lever 183 is rotated through its complete movement in the locking direction, thereby preventing further movement of the plate 172. The left handle assembly 136 is then lowered vertically until the left transversely extending bar 152 is positioned at the desired height, the walls of the corresponding irregular aperture 178 serving to guide the left handle assembly 136 smoothly through its decent, whereupon the affiliated bolt and washer assemblies 162 are tightend.

It can therefore be appreciated that a selected one of the six pairs of opposing rearward vertical apertures 166 functions in conjunction with its respective bolt and washer assembly 162 to provide means for vertically adjusting and locking the rearward handle assembly 136 at a desired position along the selected pair of rearward slots 166, while the opposing horizontal apertures 170 in communication with the six opposing pairs of rearward vertical slots 166 allow for horizontal incrementation of the rearward handle assembly 136 from any given pair of opposing vertical rearward apertures 166 to any other pair of opposing vertical rearward apertures 166. In this way, the spacing between the right and left handle assemblies 134 and 136 as well as the vertical spacing of each handle assembly 134 and 136 can be quickly and easily adjusted, yet firmly held in place, to accommodate the length and height dimensions of a given workpiece 14.

Figure 6:
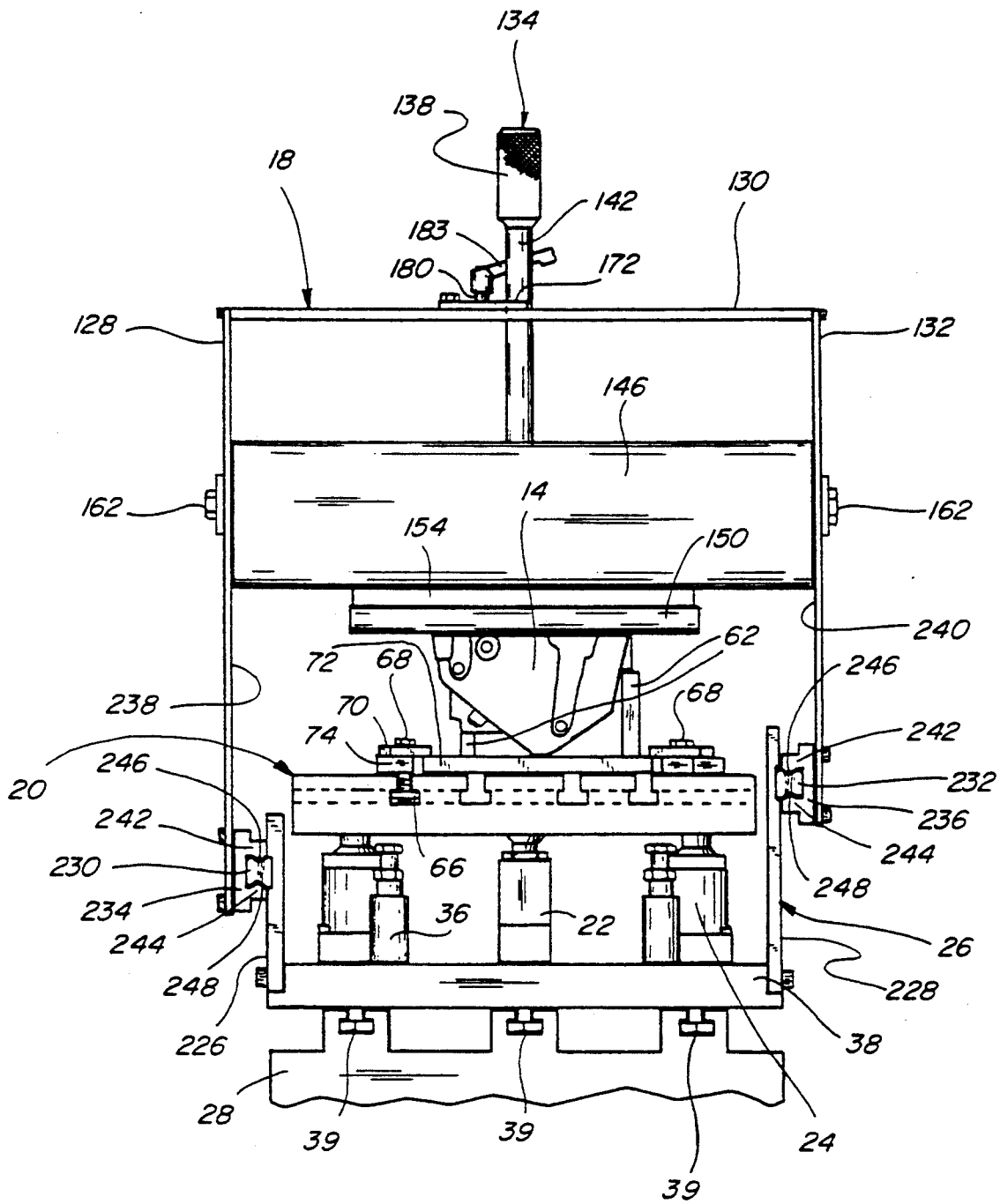
FIG. 6 is an end elevational view of the support fixture having a workpiece mounted thereto and having the carriage assembly aligned with the platen.

As shown in FIG. 6, the carriage assembly 18 communicates with the platen assembly 20 by track means 26 including parallel vertical front and back walls 226 and 228 rigidly affixed to the front and back edges, respectively, of the stationary platform 38. The right end of the walls 226 and 228 is aligned with the right edge of the stationary platform 38, while the left end of the walls 226 and 228 extends beyond the left edge of the stationary platform 38, (see FIG. 2). A front rail 230, extending the length of the front vertical wall 226, is affixed to the front face of the front wall 226, the rail 230 being declined from a high at its left end to a low at its right end by an angle A, (see FIG. 5). In the preferred embodiment, the angle A is equal to about one degree. A back rail 232, (see FIG. 6), parallel to, but shown vertically offset somewhat above the front rail 230 extends the length of the back vertical wall 228 and is affixed thereto. Front and back guide means 234 and 236 affixed to corresponding inside surfaces 238 and 240 of the front and back walls 128 and 132, respectively, simultaneously engage and move along the corresponding front and back rails 230 and 232. Upper arms 242 and lower arms 244 of the guide means 234 and 236 house ball bearing assemblies (not shown) that are receivably engaged within upper and lower troughs 246 and 248, respectively. A permanent stop 250 attached at the left-most end of the back rail 232 limits the range of travel of the back guide means 236 to the left, thereby preventing the carriage or hood assembly 18 from coming off of the track means 26. An adjustable stop 252 attached along the right portion of the back rail 232 limits the range of travel of the back guide means 236 to the right, thereby making it possible to adjust the extent of the right-most movement of the carriage assembly 18 to better accommodate the dimensions of a given workpiece 14 centered on the platen 30. It is therefore clear that the front and back guide means 234 and 236 act in conjunction with the track means 26 to support the carriage assembly 18 while permitting substantial horizontal movement of the carriage assembly 18, raising the carriage assembly 18 slightly as it is moved to the left (see FIG. 2), and lowering the carriage assembly 18 slightly as it is moved to the right (see FIG. 5). In the preferred embodiment, pneumatic means (not shown) are employed to activate leftward and rightward movement of the carriage assembly 18.

Following are the step-by-step procedures for adjusting and operating the fixture 10 in conjunction with the cutting head 16 to remove a minimal amount of material from the face 12 of a workpiece 14 necessary to make the face 12 uniformly flat, smooth and accurate:

A workpiece 14 such as an engine head or block having a surface or face 12 to be milled is selected and mounted in the cradle 62 so that the face 12 is exposed and faces upwardly. As will be described in detail hereinafter, the fixture 10 is then adjusted according to the dimensions of the workpiece 14, and the milling operation is performed. It is important to realize that the fixture 10 need not be readjusted during repeated milling operations provided each workpiece is of similar dimensions to the initial workpiece 14.

ADJUSTING PROCEDURES

With the hydraulic activating means 58 forcing fluid through the second hydraulic line 56, the platen 30 in its lowered position resting on the stationary posts 36, and the carriage assembly 18 in its home position, i.e., removed from the platen assembly 20 in its left-most position of travel, calibrating means including a block (not shown) premeasured to have an upper surface at a slightly greater height than the height of the surface of the workpiece 14 when mounted on the cradle 62 is set on the platen 30. While the cutting head teeth are prevented from rotating, the cutting head 16 is moved along its horizontal path of movement until it is positioned over the calibrating block. The cutting head 16 is then lowered toward the block until the teeth located along left-most cutting edge of the head 16 touch upper surface of the calibrating block. The cutting head 16 is then set at that height and returned to its home position.

The adjustable stop 252 is then positioned along the back rail 232 to establish the right-most point of travel of the carriage assembly 18 to be the point where the right transversely extending bar 150 will be positioned over a portion of the surface 12 near the right end of the workpiece 14 when the workpiece 14 is centered on the platen 30. With the handle assemblies 134 and 136 retained in the uppermost portion of their respective pair of opposing vertical slots 164 and 166, the carriage assembly 18 is pneumatically actuated to glide to its right-most point of travel. The bolt and washer assemblies 162 of the right handle assembly 134 are loosened, permitting the right handle assembly 134 to descend until its transversely extending bar 150 rests against the flat upper face of the calibrating block, whereupon the affiliated bolt and washer assemblies 162 are tightened. Next, the bolt and washer assemblies 162 of the left handle assembly 136 are loosened and the left handle assembly 136 is raised until its bolt and washer assemblies 162 are positioned in respective opposing horizontal apertures 170. The quick-release lever 183 is rotated in the direction that will permit transverse movement of the plate 172, and the plate 172 is slid until the teeth 173 completely disengage the longitudinal aperture 160.

The rearward handle assembly 136 is then moved horizontally until it is positioned over the area of the platen 30 over which a portion of the face 12 near the left end of the workpiece 14 will be mounted. The left handle assembly 136 is aligned with the nearest pair of opposing vertical slots 166, and the plate 172 is returned along its path of movement until the teeth 173 substantially engage the longitudinal slot 160, thereby creating the irregular apertures 178. The left vertical rod now extends through the irregular aperture 178 corresponding to the chosen pair of opposing rearward vertical slots 166, and the quick-release nut 183 is rotated in the locking direction until the plate 172 is prevented from movement. Finally, the left handle assembly 136 is lowered toward the upper surface of the calibrating block until the left transversely extending bar 152 rests against the upper surface, whereupon the associated bolt and washer assemblies 162 are tightened. The carriage assembly 18 is then pneumatically returned to its home position and the calibrating block is removed from the platen 30, thereby completing the adjustment phase of the fixture 10.

OPERATIONAL PROCEDURES

The cradle 62 having the workpiece 14 mounted therein is positioned with its cradle clamp arms 72 resting on the platen 30 and the surface 12 to be milled or ground facing upwardly away from the platen 30. The workpiece 14 is then centered on the platen 30 with its longitudinal axis parallel to the path of travel of the cutting head 16. The platen nuts 66 are inserted into the selected T-shaped channels 64 that will bring the nuts 66 into close proximity with the cradle clamp arms 72. A platen bolt 68 extending through the aperture of a mounting plate 70 is aligned with each platen nut 66, one end of the mounting plate 70 resting on the adjacent cradle clamp arm 72. A support block 74 having substantially the same thickness as the respective cradle clamp arm 72 is positioned beneath the opposing end of each mounting plate 70, whereupon the mounting bolts 68 are tightened, thereby rigidly retaining the cradle 62 against the upper surface 32 of the platen 30.

The cutting head 16 is activated to bring the teeth up to proper milling or grinding speed. The carriage assembly 18 is glided along the track means 26 to its right-most point of travel, i.e., the point where the back guide means 236 abuts the adjustable stop 252, bringing the right and left transversely extending bars 150 and 152 into spaced juxtaposition above the face 12 of the workpiece 14. At this point the hydraulic means 58 are activated to force fluid through the first hydraulic line 54, causing all of the drive cylinder assemblies 22 to simultaneously extend their respective shaft members 40 and raise the platen 30 and the workpiece 14 until the face 12 of the workpiece 14 abuts both of the transversely extending bars 150 and 152, as indicated by dotted outline numbers 184 and 186 in FIG. 2. The mechanical spring within each self-locking cylinder assembly 24 causes them to follow the platen 30 upwardly, maintaining contact with the lower surface 34 of the platen 30 as it is raised by the drive cylinder assemblies 22. As the face 12 is forced against the transversely extending bars 150 and 152, the spherical washers 50 permit the platen 30 to rotate or tilt slightly about its horizontal axes to permit the face 12 to be brought into exact planar alignment with the cutting plane P established by the lower surfaces of the transversely extending bars 150 and 152 (which were made coplanar with the milling plane P during the adjusting phase of the fixture 10, as discussed previously). The hydraulic activating means 58 are then actuated to force fluid through the third hydraulic line 60, causing the collets of all of the hydraulically self-locking cylinder assemblies 24 to simultaneously contract tightly around their respective internal cylinder, preventing further vertical movement of the self-locking cylinder assemblies 24 and, thereby, preventing any downward movement of the platen 30. Next, the hydraulic activation means 58 are switched to deactuate the first hydraulic line 54, causing all of the drive cylinder assemblies 22 to retract their respective shaft members 40 and draw the enlargements 46 tightly against their respective spherical washers 50, thereby transmitting a downward force on the platen 30. The downward force of the drive cylinder assemblies 22 is insufficient to overcome the locking force of the hydraulic self-locking cylinder assemblies 24, and therefore the platen 30 experiences no downward movement during this phase of operation. The downward force of the drive cylinder assemblies 22 serves to create sufficient frictional force between the lower surface 34 of the platen 30 and the hydraulically self-locking cylinder assemblies 24 to resist lateral movement of the platen 30 and, thus, maintain the face 12 in accurate position during the cutting phase of operation.

The carriage assembly 18 is now glided along the track means 26 to its left-most position of travel, the one degree inclination of the parallel rails 230 and 232 causing the transversely extending bars 150 and 152 to lift away from, rather than scrape across, the face 12 as the carriage assembly 18 is moved. The cutting head 16 is then precisely adjusted downward by a distance exactly equal to the thickness of the face 12 that is desired to be removed during the milling or grinding operation. The cutting head 16 is then actuated to move along the cutting plane P from right to left cutting the desired thickness from the face 12 as it progresses. When the cutting head 16 reaches its left-most position of travel, the hydraulic activation means 58 deactuates the third hydraulic line 60, thereby unlocking the hydraulic self-locking cylinder assemblies 24 and allowing the platen 30 to descend upon the stationary posts 36. This causes the face 12 of the workpiece 14 to be moved below the cutting plane P and thereby avoid contact with the cutting head 16 as it returns to its home position.

Once the cutting head 16 is returned to its home position, the workpiece 14 can be removed from the cradle 62, the cradle 62 can be removed from the platen 30, and the adjustment and operational procedures detailed above can be repeated for the next workpiece to be machined. If the next workpiece to be machined has dimensions similar to the previously machined workpiece 14, the cradle 62 need not be removed from the platen 30, and only the operational procedures detailed above need be repeated. It is understood that the fixture 10 can be operated manually, requiring an operator to activate machine assembly controls between each operational procedure, or automatically, requiring no operator involvement after initial activation of the entire machining operation.

In the movable milling machine used with the present invention 10, the plane of the teeth of the cutting head 12 is usually canted or tilted very slightly so that the left or leading edge of teeth does the cutting and the trailing edge of teeth has no effect.

Although the preferred embodiment herein disclosed shows the fixture 10 as having the platen 30 positioned in a substantially horizontal position for use with a cutting head 16 having a horizontal cutting plane P of travel, it is understood that the fixture 10 can be operated with the platen 30 positioned other than horizontally for use with cutting heads 16 having cutting planes P of travel in other than the horizontal.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

Thus there has been shown and described a novel adjustable support fixture for locating a surface to be milled or grounded at a precise location relative to the milling or cutting machine which device fulfill all the objects and advantages sought therefor. It will be apparent to those skilled in the art however, that many changes, modifications, variations and other uses in applications for the subject device or possible, and all such changes, modifications, allerations and other uses in applications which do not depart from the spirit and scope of the invention are deemed to be covered by the invention which is limited only be the claims which follow.

What is claimed is:

1. A fixture on which a workpiece is mounted having a flat surface to be machined by a machine tool that cuts in a plane, the fixture including means for aligning and maintaining the plane of the flat workpiece surface in precise orientation relative to the plane of travel of the machine tool so as to be able to remove an amount of material necessary to recondition the flat surface and make it planar and accurate, the fixture comprising:

a platen having a support surface and a surface opposite thereto, said platen being tiltable about the plane of the support surface, means on the support surface including means for supporting the workpiece having a flat surface to be machined facing upwardly from the support surface, means for establishing a plane in the cutting plane of the machine tool at a location above the platen, means for moving the platen with the workpiece thereon so that the flat surface thereof bears against the means for establishing the plane, and locking means for restraining movement of the platen with the workpiece surface in the cutting plane of the machine tool.

2. The fixture of claim 1 wherein the platen includes a gridwork of inverted T-shaped channels communicating with the space above the platen and means engageable therewith to attach the workpiece to the platen.

3. The fixture of claim 1 wherein the means for moving the platen include a plurality of hydraulic lifting devices located at spaced locations adjacent the opposite surface of the platen, means to simultaneously actuate the hydraulic devices to apply upward lifting force on the platen to move the flat workpiece surface into engagement with the means establishing the cutting plane.

4. The fixture of claim 3 wherein the locking means include a plurality of hydraulic self-locking devices located at spaced locations adjacent the opposite side of the platen, the hydraulic self-locking devices maintaining the flat surface of the workpiece engaged with the means establishing the cutting plane independently of the hydraulic lifting devices.

5. The fixture of claim 1 wherein the means establishing the cutting plane include a carriage movable between a position spaced from the platen and a position aligned with the platen, said carriage having at least two transversely extending members located thereon establishing the cutting plane when the carriage is in its position aligned with the platen.

6. The fixture of claim 5 including track means supporting the carriage for movement therealong.

7. The fixture of claims 6 wherein the track means are oriented at an acute angle relative to the flat surface of the workpiece.

8. The fixture of claim 1 including track means for supporting and guiding the machine tool during movement in the cutting plane.

9. A fixture for supporting a workpiece having a surface to be milled by a milling tool in a predetermined position while being milled, the fixture comprising:
   a substantially horizontal platen tiltable to a limited extent relative to its horizontal plane, the platen having an upper surface and fastening means for affixing the workpiece to the upper surface with the surface to be milled facing upwardly,
   means for establishing a plane above the platen in a cutting plane of the milling tool,
   spaced means located under the platen actuatable in unison to raise the platen and the workpiece thereon to move the workpiece surface to be milled into engagement with the means establishing the plane,
   means to lock the platen in the last named position to maintain the workpiece surface in the cutting plane of the milling tool, and;
   track means supporting the means for establishing the plane for movement horizontally relative to the platen.

10. The fixture of claim 9 wherein the fastening means include a gridwork of inverted T-shaped channels located extending downwardly from the upper surface of the platen and means cooperatively engageable with the channels to anchor the workpiece to the platen.

11. The fixture of claim 9 wherein the spaced means include a plurality of hydraulic actuatable devices located at spaced locations below the platen, the hydraulic actuatably devices being simultaneously actuatable to apply vertical moving force to the platen.

12. The fixture of claim 9 wherein the means to lock the platen include a plurality of hydraulic actuatable self-locking devices located at spaced locations below the platen, the hydraulic self-locking devices including means to maintain them in continuous resilient contact with the platen.

13. The fixture of claim 9 wherein the means for establishing a plane above the platen include a carriage assembly moveable horizontally between a position spaced from the platen and a position aligned with the platen, the carriage having at least two transversely extending members located thereon, the transversely extending members having lower surfaces and means for adjusting the positions of the lower surfaces to be substantially coplanar with the cutting plane of the milling tool when the carriage is aligned with the platen.

14. The fixture of claim 13 wherein the track means include spaced parallel inclined rails and means on the carriage engageable with the rails to permit movement of the carriage therealong.

15. The fixture of claim 9 including other track means for supporting and guiding the milling tool during operation in the cutting plane.

16. Means to accurately locate a surface on a workpiece in the plane of a cutting head of a milling machine comprising:
   a workpiece support platen including means to locate and support a workpiece having an upwardly facing surface to be milled thereon,
   means to establish a plane for the surface to be milled including a carriage movable between a position spaced from the platen and a position aligned with and extending above the platen, said carriage having at least two members located thereon and having means to adjust the positions thereof on the carriage to establish a plane in the cutting plane of the cutting head,
   means to support the platen from beneath for vertical movement including a plurality of vertically adjustable lifting devices at spaced locations below the platen, said vertically adjustable devices being simultaneously actuatable to apply vertical lifting force to the platen and to the workpiece supported thereon,
   other means under the platen actuatable to lock the platen in a fixed position independently of the lifting devices, and
   track means including means on the carriage engageable therewith for movably supporting the carriage for movement therealong between a position aligned with the platen and a position spaced therefrom.

17. The means of claim 16 wherein the means to locate and support the workpiece include a gridwork of inverted T-shaped channels located in the surface of the platen and means engageable therewith to anchor the workpiece to the platen.

18. The means of claim 16 wherein the vertically adjustable lifting devices are hydraulically actuatable to impart vertical moving force to the platen.

19. The means of claim 16 wherein the other means include hydraulically actuatable devices.

20. The means of claim 17 wherein the track means include inclined spaced parallel rails.

21. Means to accurately locate a relatively flat surface on a workpiece in a cutting plane of a workpiece cutting tool comprising:
   a workpiece support platform having upper and lower surfaces and means on the upper surface for supporting a workpiece having its relatively flat surface facing upwardly,
   said support platform being located in position to have the workpiece cutting tool move thereabove,
   means to establish a plane in the cutting plane of movement of the cutting tool above the platform,
   means to support and vertically move the platform including a plurality of vertically adjustable hydraulic devices positioned at spaced locations below the platform, each hydraulic device having means engagable with the lower surface of the platform,
   means for applying hydraulic pressure to the hydraulic devices to move the platform and the workpiece supported thereon in an upward direction whereby the flat surface of the workpiece is moved against the means establishing the plane in the cutting plane of movement of the cutting tool, other means engagable with the lower surface the platform for locking the platform in a position with the flat surface of the workpiece engaging the means establishing the plane independently of the hydraulic devices, and means for moving the means establishing the plane out of engagement with the flat surface of the workpiece so that the cutting tool can be moved across and cut the flat workpiece surface.

22. Means to accurately locate a relatively flat surface on a workpiece in a plane of a workpiece cutting tool comprising:

a workpiece support platform having upper and lower surfaces and means on the upper surface for supporting a workpiece having its relatively flat surface facing upwardly, said support platfrom being located in position to have the workpiece tool move thereacross, means to establish a plane of movement of the cutting tool above the platform, means to support and move the platform including a plurality of vertically adjustable hydraulic devices at spaced locations below the platform, each hydraulic device having means engageable with the underside of the platform, means for applying hydraulic pressure to the hydraulic devices to move the platform and the workpiece supported thereon in an upward direction whereby the flat surface of the workpiece is moved against the means establishing a plane in the cutting plane of the cutting tool, other means engageable with the underside of the platform for locking the platform in a position with the flat surface of the workpiece engaging the means establishing the plane independently of the hydraulic means, and means for moving the means establishing the plane in the cutting plane out of engagement with the flat surface of the workpiece so that the cutting tool can be moved across to trim the flat workpiece surface.

23. The fixture of claim 1 wherein the means establishing a plane in the plane of the cutting plane of a machine tool at a location above the platen include a carriage assembly movable between a position spaced from the platen and a position aligned with the platen, said carriage assembly having a top wall and two spaced side walls, means extending downwardly from the top wall between the spaced side walls including spaced members adjustable vertically for establishing the plane in the plane of the machine tool, and a calibration block set on the platen and having an upper surface adapted to be oriented in the cutting plane of the machine tool, said means establishing the plane including means for adjusting the means on the carriage establishing the plane into engagement with the upper surface of the calibration block.

24. The fixture of claim 3 wherein each of said pluralities of lifting devices includes means to enable relative angular movement between the respective lifting devices and the platen.

25. A fixture for supporting a workpiece having a surface to be machined by a machine tool that moves in a planar cutting path, the fixture including means for aligning and maintaining the workpiece surface in substantially coplanar orientation relative to the cutting path of the machine tool so as to enable precise and accurate removal of an amount of surface material necessary to make the surface planar, the fixture comprising:

a platen having a support surface and a surface opposite thereto, the platen being tiltable about the plane of the support surface, means on the support surface including means for restraining the workpiece when mounted thereto with the surface to be machined facing away from the support surface, movable means for establishing a plane coplanar with the cutting path when the means for establishing the plane are aligned with the platen, means for moving the platen when the workpiece is mounted thereto and when the means for establishing the plane are aligned therewith causing the surface to be machined to bear against the means for establishing the plane and thereby become coplanar with the established plane, and locking means for restraining movement of the platen with the workpiece surface coplanar to the cutting path of the machine tool.

26. A fixture for supporting a workpiece having a surface to be machined by a machine tool that moves in a planar cutting path, the fixture including means for aligning and maintaining the workpiece surface in substantially coplanar orientation relative to the cutting path of the machine tool so as to enable precise and accurate removal of an amount of surface material necessary to make the surface planar, the fixture comprising:

a platen having a support surface and a surface opposite thereto, the platen being tiltable about the plane of the support surface, means on the support surface including means for restraining the workpiece when mounted thereto with the surface to be machined facing away from the support surface, means for establishing a plane coplanar with the cutting path, the means including a calibration block mountable on the support surface of the platen and having an upper surface adapted to establish the cutting plane of the machine tool, and a carriage assembly movable between a position spaced from the platen and a position aligned with the platen, the carriage assembly including adjustable members engageable with the upper surface of the calibration block when the carriage assembly is aligned with the platen, means for moving the platen when the workpiece is mounted thereon and the carriage assembly is aligned therewith causing the surface to be machined to bear against the adjustable members and thereby become coplanar with the established plane, and locking means for restraining movement of the platen with the workpiece surface coplanar to the cutting path of the machine tool.

27. A method for supporting a workpiece having a surface to be machined by a machine tool that moves in a planar cutting path, bringing the surface into substantially coplanar orientation relative to the cutting path, and retaining the surface in said orientation so as to enable precise and accurate removal by the machine tool of an amount of surface material necessary to make the surface planar, the method comprising the steps of:

mounting the workpiece on a support surface of a platen tiltable about the plane of the support surface, the workpiece being oriented so that the surface to be machined faces away from the support surface, aligning plane-establishing means adjacent to the surface to be machined, the plane-establishing means establishing a plane that is coplanar with the cutting path of the machine tool, driving the platen toward the plane-establishing means until the surface to be machined bears against the plane-establishing means, the platen tilting as needed to bring the surface to be machined into coplanar alignment with the established plane, restraining movement of the platen to maintain the surface to be machined in coplanar orientation with the established plane, and removing the plane-establishing means from the surface to be machined.

28. A method for adjusting and operating a fixture for supporting a workpiece having a surface to be machined by a machine tool that moves in a planar cutting path, bringing the surface into substantially coplanar orientation relative to the cutting path, and retaining the surface in said orientation so as to enable precise and accurate removal by the machine tool of an amount of surface material necessary to make the surface planar, the method comprising the steps of:

placing a calibration block having a planar surface adapted to establish the planar cutting path of the machine tool on a support surface of a platen tiltable about the plane of the support surface so that the planar surface of the calibration block faces away from the support surface of the platen, bringing the machine tool from a home position into engagement with the upper surface of the calibration block and setting the machine tool accordingly to establish its planar cutting path, returning the machine tool to its home position, aligning movable means having adjustable members with the calibration block, fixedly adjusting the adjustable members against the upper surface of the calibration block, moving the movable means from alignment with the calibration block, removing the calibration block from the support surface of the platen, mounting the workpiece on a support surface of a platen tiltable about the plane of the support surface, the workpiece being oriented so that the surface to be machined faces away from the support surface, aligning the movable means with the platen, the adjustable members establishing a plane that is coplanar with the cutting path of the machine tool, driving the platen toward the plane-establishing means until the surface to be machined bears against the adjustable members, the platen tilting as needed to bring the surface to be machined into coplanar alignment with the cutting path of the machine tool, restraining movement of the platen to maintain the surface to be machined in coplanar orientation with the cutting path, and moving the movable means from alignment with the platen.

* * * * *